United States Patent Office 3,454,469
Patented July 8, 1969

3,454,469
MICROBIOLOGICAL PROCESS FOR PREPARING AMINOSIDINE
Ernesto Cotta, Arpad Grein and Celestino Spalla, Milan, Italy, assignors to Società Farmaceutici Italia, Milan, Italy, a corporation of Italy
No Drawing. Filed Apr. 20, 1966, Ser. No. 543,811
Claims priority, application Italy, Nov. 17, 1965, 11,253/65
Int. Cl. C12d 9/00
U.S. Cl. 195—80          2 Claims

ABSTRACT OF THE DISCLOSURE

Described is a microbiological process for preparing the antibiotic aminosidine. This process comprises cultivating highly pigmented colonies of Streptomyces fradiae varietas italicus under aerobic conditions in a liquid nutrient medium containing a source of carbon, nitrogen and mineral salts at a temperature between 24° and 37° C,. over a period from 72 to 144 hours at pH from 6.5 to 8, and separating the antibiotic aminosidine from the fermentation broth.

---

Our invention relates to a new microbiological process for preparing the antibiotic aminosidine by using the new microorganism Streptomyces fradiae varietas italicus also called Streptomyces F.I. 2150, which has been deposited at the Institute of Microbiology of the Rutgers University, U.S.A., where it received the index number I.M. 3902, and at the Commonwealth Mycological Institute, Ferry Lane, Kew, Surrey, England, where it received the index number I.M.I. 116,271.

The antibiotic aminosidine which is also called F.I. 1600 and the process for its microbiological preparation by Streptomyces krestomyceticus are disclosed in U.S. Patent No. 3,065,147 to Arcamone et al.

We have now found, and this constitutes an object of the invention, that the antibiotic aminosidine may be produced in high yields by fermentation of the new microorganism Streptomyces fradiae varietas italicus.

The new strain Streptomyces F.I. 2150 producing aminosidine had been isolated from a petroleum impregnated soil sample taken from an oil well near Ascoli Satriano (Foggia, Italy) and shows the following characteristics:

MICROSCOPIC ASPECT

The vegetative mycelium on usual media consists of very thin, 0.5–1.1µ thick, not very long and frequently branched hyphae. These hyphae scarcely and on particular synthetic medium form aerial, isolated, rather short, straight, unbranched filaments, which in certain cases divide forming a chain of conidia.

MACROSCOPIC ASPECT

Table I lists the cultural properties observed on various media. The observations were made on the 6th, 12th, 20th and 30th day of incubation at 28° C. The strain grows slowly on synthetic as well as organic agar forming a vegetative mycelium consisting of a compact, smooth, unfolded, rather hard patina, which is lemon-orange on synthetic media and orange-brown on organic media.

BIOCHEMICAL PROPERTIES

Gelatin: complete hydrolysis
Nitrates: no reduction to nitrites
Hydrogen sulphite: negative
Milk: coagulation and peptonization
Starch: moderate hydrolysis
Tyrosinasis: positive
Production of acids: positive from glucose, meso-inositol, d-mannitol, d-fructose, maltose and raffinose, negative from l-arabinose, saccharose, d-xylose and rhamnose.

The microorganism does not grow at 50° C. and does not produce solerotia; it does not produce soluble pigments. In a liquid submerged culture with stirring, the strain produces the antibiotic aminosidine.

TABLE I.—CULTURE CHARACTERISTICS OF STREPTOMYCES F.I. 2150

| Medium | Growth | Aerial Mycelium | Vegatative Mycelium | Soluble Pigments |
|---|---|---|---|---|
| Bennet agar [1] | Abundant in little confluent colonies with smooth patina. | Absent | Orange | Absent. |
| Czapek agar [1] | Scarce in little confluent colonies with smooth patina. | Scarce, straight, unbranched sporophores. | From colorless to light orange-lemon. | Do. |
| Glucose-asparagine agar [1] | Abundant in little confluent colonies with smooth patina. | Absent | Orange-brown | Do. |
| Glycerol-glycine agar [1] | do | do | From orange-lemon to light brown. | Do. |
| Emerson agar [1] | Abundant, slightly folded | do | From orange to brown | Do. |
| Starch agar [2] | Abundant in little confluent colonies with smooth patina. | Scarce, straight, unbranched sporophores. | Orange | Do. |
| Potato-glucose agar [4] | do | Absent | Orange to brown | Do. |
| Oats agar [3] | do | Scarce, straight, unbranched sporophores. | Orange which grows pale with age. | Do. |
| Asparagine-glycine agar [1] | do | do | Lemon-orange | Do. |
| Yeast-glucose extract agar [1] | Abundant in little confluent colonies with slightly folded patina. | Absent | From orange to brown | Do. |
| Peptone-starch agar [1] | Abundant in little confluent colonies with smooth patina. | do | Orange | Do. |
| Peptone agar plus KNO₃ [1] | do | do | Orange which grows pale with age. | Do. |

[1] Waksman S. A.: "The Actinomycetes" vol. II, pp. 328–334, The William and Wilkins Company (1961).
[2] Pridham T. G. et al.: Antibiotics Annual 1956–1957, pp. 947–953.
[3] Baldacci E. et al.: Giornale di Microbiologia 9, p. 39 (1961).
[4] Potato glucose-agar: 200 g. peeled potatoes, 20 g. glucose, 20 g. agar, 1,000 cc. distilled water at pH 7.2.

IDENTIFICATION OF THE STRAIN

The description of the new microorganism corresponds to that of the genus Streptomyces Waksman and Henrici reported in Bergey's "Manual of Determinative Bacteriology" (7th Edition 1957, pp. 744–745).

Streptomyces F.I. 2150 belongs to the section "Rectus flexibilis" of Pridham et al. (App. Microbiol. 6, 1958, p. 52), to the series "Fradiae" of Baldacci (Giorn. Microbiol. 6, 1958, p. 10) and to the series "Fradiae" of Waksman (The Actinomycetes, vol. II, 1961, p. 111).

A comparison between the characteristics of the microorganism under examination and those of the species belonging to the systemic cited groups (taxa), shows a close likeness between our microorganism and Streptomyces fradiae (Waksman and Curtis 1916; Waksman and Henrici 1948). Tables II and III list comparative data between the characteristics of Streptomyces F.I. 2150 and the strain IMRU 3535 of *S. fradiae*, both being carried out under identical culture conditions.

Streptomyces F.I. 2150 differs from *S. fradiae* IMRU 3535 because it utilizes 1-arabinose, xylose, mesoinositol and d-mannitol and because it reduces nitrates.

It differs also because it forms an unspiralled sporophores mycelium. The last character in *S. fradiae* species is remarkably variable. In the description of *S. fradiae* reported by Waksman (Actinomycetes vol. II, 1961, p. 211) it is said "Sporophores branched monopodially, straight or flexible, but no true spirals. On certain media, such as glycerol agar, spirals are formed. Ettlinger et al. (1958) found open spirals." Pridham in this classification (Applied Microbiology vol. VI, 1958, p. 52) has considered the species *S. fradiae* belonging to three distinct sections: in section "Rectus flexibilis," which, as known, does not form spirals, in section "Retinaculum apertus" which does not form spirals, as well as in section "Spira" which is characterized by spiralled sporophores.

Therefore it is impossible to give this character a determinative meaning for the identification of the species *S. fradiae*. In other words, it is impossible to ascertain whether *S. fradiae* forms or does not form spiralled sporophores; the only possible interpretation is that to the species *S. fradiae* belong spiralled and unspiralled microorganisms.

From the above it may be concluded that Streptomyces F.I. 2150 is a new variety of the species *S. fradiae*, which we designate *Streptomyces fradiae varietas italicus*.

*Streptomyces krestomyceticus*; orange with brown shades in Streptomyces F.I. 2150) with morphological characteristics of its aerial mycelium (hooked, scanty, spiralled in *Streptomyces krestomyceticus*; straight in Streptomyces F.I. 2150) and with the capacity of utilizing saccharose.

(2) Streptomyces F.I. 2150 differs from *Streptomyces rimosus forma paramomycinus* (U.S. Patent No. 2,916,485) in the color of the vegetative mycelium (from colorless to light brown, or light yellow in *Streptomyces rimosus forma paramomycinus*; orange with brown shades in Streptomyces F.I. 2150); in the type of growth and surface of the colonies (frequently wrinkled or folded with splits in *Streptomyces rimosus forma paramomycinus*; smooth and without splits in Streptomyces F.I. 2150); and in the characteristics of the aerial mycelium (abundant, spiralled in *Streptomyces rimosus forma paramomycinus*; very scarce and straight in Streptomyces F.I. 2150).

(3) Streptomyces F.I. 2150 differs from *Streptomyces catenulae* (U.S. Patent No. 2,895,876) in that *Streptomyces catenulae* has a greenish grey brown vegetative mycelium, reduces nitrates and does not utilize fructose and mesoinositol.

(4) Streptomyces F.I. 2150 differs from *Streptomyces pulveraceus* (French Patent No. 1,294,121) in that *Streptomyces pulveraceus* has spiralled sporophores, forms soluble pigments on various media, peptonizes milk without coagulation and reduces nitrates.

(5) Streptomyces F.I. 2150 differs from *Streptomyces*

TABLE II.—COMPARISON BETWEEN THE CULTURAL CHARACTERISTICS OF STREPTOMYCES F.I. 2150 AND STREPTOMYCES FRADIAE IMRU 3535

| Medium | Streptomyces F.I. 2150 | | Streptomyces fradiae IMRU 3535 | |
|---|---|---|---|---|
| | Vegetative Mycelium | Aerial Mycelium | Vegetative Mycelium | Aerial Mycelium |
| Bennet agar | Abundant, orange-light brown. | Absent | Abundant, orange | White with straight sporophores. |
| Czapek agar | Scarce, straw-colored | Scarce, straight unbranched sporophores. | Scarce, colorless | Do. |
| Asparagine-glucose agar | Abundant, deep orange | Absent | Abundant, orange-lemon | White-cream with straight sporophores. |
| Glycerol-glycine agar | Abundant, lemon-orange | Scarce, unbranched sporophores. | Abundant, straw-colored | White-pink-yellow with straight sporophores and spiralled sporophores. |
| Emerson's agar | Abundant, orange-brown | Absent | Abundant, orange-brown | Scarce, whitish. |
| Starch agar | Abundant, light orange | Scarce, straight unbranched sporophores. | Abundant, orange-lemon | Abundant, pink with hooked sporophores. |
| Potato-glucose agar | Abundant, orange-brown | Absent | do | Cinnamon-pink with spiralled sporophores. |
| Oats agar | Abundant, orange | Scarce, straight unbranched sporophores. | do | Abundant, pink with spiralled sporophores. |
| Asparagine-glycerol agar | Abundant, lemon-orange | do | Abundant, lemon-orange | Scarce, whitish with straight sporophores. |
| Glucose-yeast extract agar | Abundant, orange-brown | Absent | Abundant, orange-brown | Do. |

TABLE III.—COMPARISON BETWEEN THE BIOCHEMICAL CHARACTERISTICS OF STREPTOMYCES F.I. 2150 AND STREPTOMYCES FRADIAE IMRU 3535

| | S. F.I. 2150 | S. fradiae 3535 |
|---|---|---|
| Utilization of glucose | + | + |
| Utilization of l-arabinose | − | + |
| Utilization of saccharose | − | − |
| Utilization of d-xylose | − | + |
| Utilization of meso-inositol | + | − |
| Utilization of d-mannitol | + | − |
| Utilization of d-fructose | + | + |
| Utilization of maltose | + | + |
| Utilization of rhamnose | − | − |
| Hydrolysis of gelatine | + | + |
| Tyrosine attack | + | + |
| Melanine production | − | − |
| Hydrolysis of starch | + | + |
| Production of hydrogen sulfate | − | − |
| Reduction of nitrites | − | + |
| Coagulation and peptonization of milk | + | + |

The characteristics of the microorganism under examination are sufficient to identify it from the other species producing aminosidine or similar antibiotics. This appears clearly from the following comparisons.

(1) Streptomyces F.I. 2150 differs from *Streptomyces krestomyceticus* (Canevazzi e Scotti, Giorn. Microbiol. 7, 242, 1959) because of the color of its vegetative mycelium (from colorless to cream colored to yellowish in

*paucisporogenes* (Nagamann et al.: Annales Pharmaceutiques Francaises, 16, p. 585, 1958) in that the latter forms a yellow to beige vegetative mycelium with splits and also forms a brown soluble pigment.

(6) Streptomyces F.I. 2150 differs from *Streptomyces circulatus* var. *monomycini* (Antibiotiki 5(4):3, 1960) in that the latter forms spiralled sporophores, a yellow to grey vegetative mycelium, a grey-brown soluble pigment and coagulates milk without peptonization.

Cultures of the new microorganism may be stored by successive transfers on a solid, preferably semisynthetic medium or by lyophilization of the mycelium suspended in milk. The aminosidine producing characteristic is accompanied by a high orange pigmentation of the mycelium. Consequently, it is advantageous to carry out isolations on agar, preferably potato agar, and choosing the more pigmentated colonies.

The object of the invention is a microbiological process for the preparation of the antibiotic aminosidine by fermentation of the new microorganism Streptomyces F.I. 2150 in a culture medium containing sources of carbon, nitrogen and mineral salts, and extracting the antibiotic aminosidine in a known manner. More particularly, the microorganism is grown in a liquid culture medium in aerobic conditions at a temperature between 24 and 37° C., preferably at 28° C., for a period of from 72 to 144 hours. The pH may vary according to the fermentation medium used and is from 6.5 to 8. As carbon source the following may be utilized: glucose, dextrine, starch, various meals (maize, soya, wheat, etc.), corn steep and other substances of common use. The nitrogen source, besides the above complex substances containing nitrogen, may consist of casein, casein hydrolisates and ammonium salts such as sulfate, phosphate, ammonium chloride and other substances of common use. The mineral salts useful for the fermentation vary according to the medium employed. Calcium carbonate is normally present, and sodium, potassium, magnesium, manganese, iron, copper and zinc, as well as chlorides, sulfates or phosphates may be added. The fermentation may be carried out in Erlenmeyer flasks and in laboratory or industrial fermenters of various capacity. The extraction may be carried out by known techniques.

The amount of antibiotic in the broth may be qualitatively assessed by paper chromatography in comparison with a standard sample of aminosidine and quantitatively by spectrophotometric or biological methods.

The following examples serve to illustrate the invention without intent to limit it:

Example 1

Into each of two 300 cc. Erlenmeyer flasks, 60 cc. of the following medium is poured:

|  | Percent |
|---|---|
| Dextrine | 3 |
| Calcium carbonate | 0.4 |
| Casein | 0.5 |
| Corn steep liquor | 0.3 |
| Ammonium sulphate | 0.1 |
| Potassium sulphate (in tap water) | 0.01 | and sterilized by heating to 120° C. for 20 minutes. The pH of the medium after sterilization is between 6.8 and 7. Each flask is inoculated with 2 cc. of a mycelium suspension obtained by scraping off a 15-day-old patina of Streptomyces F.I. 2150 slant on potato agar into 5 cc. of sterile distilled water. The flasks are incubated at 27° C. for 26 hours on a rotary shaker with a stroke of 3.5 cm. at 220 r.p.m. Then 1 cc. of this culture is used to inoculate other 300 cc. flasks containing 60 cc. of the following productive medium:

|  | Percent |
|---|---|
| Dextrine | 4 |
| Calcium carbonate | 0.5 |
| Corn steep liquor | 1 |
| Ammonium sulphate | 0.1 |
| Casein | 1 |
| Potassium hydrogen phosphate in tap water | 0.01 |

Sterilization is carried out by heating at 120° C. for 20 minutes. The pH after sterilization varies between 6.7 and 7. The flasks are incubated at 27° C. in the same conditions as above. After 120 hours a production of 750 mcg./cc. of aminosidine is obtained.

Example 2

Operating as in Example 1 with the difference that the vegetative fermentation is carried out using part of the productive medium. The aminosidine concentration so obtained is of 850 mcg./cc.

Example 3

Operating as in Example 1, the difference being that the productive medium has the following composition:

|  | Percent |
|---|---|
| Starch | 6 |
| Casein | 1 |
| Degreased soybean meal | 2 |
| Beet molasses | 0.2 |
| Calcium carbonate | 0.4 |
| Magnesium sulphate heptahydrate in tap water | 0.1 |

Sterilization is carried out by heating to 120° C. for 20 minutes. The pH after sterilization varies from 6.6 to 6.8. After 144 hours of incubation 900 mcg./cc. of aminosidine are obtained.

Example 4

500 cc. of the vegetative medium of Example 1 are sterilized by heating to 120° C. for 20 minutes in three 2000 cc. flasks having three internal barriers. After cooling, each flask is inoculated with the suspension obtained by scraping off, in water, the patina of a test tube culture. The flasks are then incubated at 28° C. on a rotary shaker at 120 r.p.m. with a stroke of 4.5 cm. for 28 hours. In an 80-liter stainless steel fermenter, 50 liters of the productive medium of Example 1 are sterilized by heating to 120° C. for 30 minutes. After cooling, the medium is inoculated with the above cultures (1500 cc.) and incubated at 28° C. Sterile air at the rate of 35 l./min. is bubbled throughout the medium and stirring is carried out with a 4-paddle stirrer at 200 r.p.m. The pressure within the fermenter is maintained at 1 atmosphere. After 120 hours, the culture has a concentration in aminosidine of 750 mcg./cc.

We claim:

1. A microbiological process for preparing the antibiotic aminosidine, which comprises cultivating highly pigmented colonies of Streptomyces fradiae varietas italicus under aerobic conditions in a liquid nutrient medium containing a source of carbon, nitrogen and mineral salts at a temperature between 24° to 37° C., over a period from 72 to 144 hours at pH from 6.5 to 8, and separating the antibiotic aminosidine from the fermentation both.

2. The method of claim 1, wherein the cultivation temperature is 28° C.

References Cited

UNITED STATES PATENTS 3,330,737   7/1967   Maruati et al. _____ 195—80 X

MAURICE W. GREENSTEIN, *Primary Examiner.*